United States Patent
VanDerWege et al.

(10) Patent No.: US 9,169,791 B2
(45) Date of Patent: Oct. 27, 2015

(54) ENGINE-LOAD MANAGEMENT TO REDUCE PARTICULATE EMISSIONS

(75) Inventors: Brad Alan VanDerWege, Canton, MI (US); Ken Jahr, West Bloomfield, MI (US); Joseph Norman Ulrey, Dearborn, MI (US); Todd Anthony Rumpsa, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1006 days.

(21) Appl. No.: 13/174,414

(22) Filed: Jun. 30, 2011

(65) Prior Publication Data

US 2013/0000601 A1  Jan. 3, 2013

(51) Int. Cl.
    F02D 41/06 (2006.01)
    F02D 41/00 (2006.01)

(52) U.S. Cl.
    CPC ............ F02D 41/0007 (2013.01); F02D 41/06 (2013.01); *F02D 41/064* (2013.01); *F02D 2041/001* (2013.01); *Y02T 10/144* (2013.01); *Y10T 477/688* (2015.01)

(58) Field of Classification Search
    CPC ...... F02M 7/00; F02D 35/023; F02D 35/028; F02D 41/0007; F02D 41/06; F02D 41/064
    USPC .................................................. 123/345, 346
    See application file for complete search history.

(56) References Cited

U.S. PATENT DOCUMENTS

| 4,843,916 | A  | * | 7/1989  | Bouta           | 477/97    |
|-----------|----|---|---------|-----------------|-----------|
| 6,769,400 | B1 |   | 8/2004  | Ament           |           |
| 6,978,603 | B2 |   | 12/2005 | Asanuma         |           |
| 7,331,317 | B2 | * | 2/2008  | Yasui et al.    | 123/90.15 |
| 7,725,243 | B2 | * | 5/2010  | Natsui et al.   | 701/105   |
| 2006/0112680 | A1 | * | 6/2006 | Beer et al.    | 60/284    |
| 2008/0210208 | A1 | * | 9/2008 | Tateno          | 123/689   |
| 2008/0229743 | A1 | * | 9/2008 | Nelson          | 60/598    |
| 2009/0118971 | A1 | * | 5/2009 | Heap et al.     | 701/102   |
| 2009/0150059 | A1 | * | 6/2009 | Santoso et al.  | 701/113   |
| 2009/0281709 | A1 | * | 11/2009| Mallebrein et al.| 701/104  |
| 2009/0283074 | A1 | * | 11/2009| Narisako et al. | 123/497   |
| 2010/0037860 | A1 |   | 2/2010  | Morita et al.  |           |

FOREIGN PATENT DOCUMENTS

JP     2005155395 A  *  6/2005  ............ F02D 43/00

* cited by examiner

*Primary Examiner* — Stephen K Cronin
*Assistant Examiner* — Xiao Mo
(74) *Attorney, Agent, or Firm* — James Dottavio; Alleman Hall McCoy Russell & Tuttle LLP

(57) ABSTRACT

A method for operating an engine of a vehicle. During a warm-up period following a cold start of the vehicle, a cylinder of the engine is charged to a reduced air-charge pressure, and fuel is injected into the cylinder. After the warm-up period, the cylinder is charged to a non-reduced air-charge pressure, greater for an equivalent driver demand than the reduced air-charge pressure, and fuel is injected into the cylinder.

17 Claims, 6 Drawing Sheets

ENGINE-LOAD MANAGEMENT TO REDUCE PARTICULATE EMISSIONS

TECHNICAL FIELD

This disclosure relates to the field of motor vehicle engineering, and more particularly, to controlling particulate emissions from motor-vehicle engine systems.

BACKGROUND AND SUMMARY

A direct-injection (DI) engine may emit increased particulate matter (PM) under certain operating conditions. During a cold start, for example, fuel injected into the combustion chambers of the engine may be inadequately vaporized, requiring excess fuel injection to achieve stable combustion. The excess fuel may result in an over-rich air-to-fuel ratio, which causes increased PM emission. This issue may be exacerbated when the engine is significantly loaded during the cold start, as higher engine load results in increased manifold air pressure (MAP), which may reduce the degree of atomization and vaporization of the injected fuel.

To remedy this issue, U.S. Pat. No. 6,769,400 provides for a vehicle an electric propulsion system in parallel with a combustion propulsion system. The electric propulsion system is engaged to reduce the MAP of the combustion propulsion system to a predetermined pressure before initiating the combustion propulsion system. While the strategy proposed in the reference may reduce emissions—possibly including PM emissions—in hybrid vehicles, such active suppression of MAP may delay acceleration in turbocharged engine systems.

The inventors herein have recognized these issues and have proposed a series of solutions to address them. Accordingly, one embodiment provides a method for operating an engine of a vehicle, comprising: during a warm-up period following a cold start of the vehicle and in response to insufficient atomization of directly injected fuel causing increased particulate emissions, delaying a transmission up-shift to a higher driver-demand level than would otherwise cause the up-shift for a given condition. In this way, for a given acceleration profile, the delayed up-shift provides a greater degree of operation (e.g., number of combustion events) at higher speeds/lower loads, and thus a greater degree of operation with lower manifold pressure as compared to the shift timing that would otherwise occur. In this way, reduce emissions can be achieved, at least over a portion of the acceleration profile where the shift is delayed.

Another embodiment provide a method for operating an engine of a vehicle in response to a driver demand. During a warm-up period following a cold start of the vehicle, a cylinder of the engine is charged to a reduced air-charge pressure, and fuel is injected into the cylinder. After the warm-up period, the cylinder is charged to a non-reduced air-charge pressure, greater for an equivalent driver demand than the reduced air-charge pressure, and fuel is injected into the cylinder. In another embodiment, a speed threshold at which an automatic transmission of the vehicle shifts to a higher gear is increased during the warm-up period. After the warm-up period, the speed threshold is lowered. The warm-up period may last until fuel, if injected into a cylinder charged to the non-reduced air-charge pressure, would be vaporized at target efficiency. In this manner, the air-charge pressure in the cylinder is reduced during the warm-up period, resulting in better atomization of the fuel and lower PM emissions.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 1:
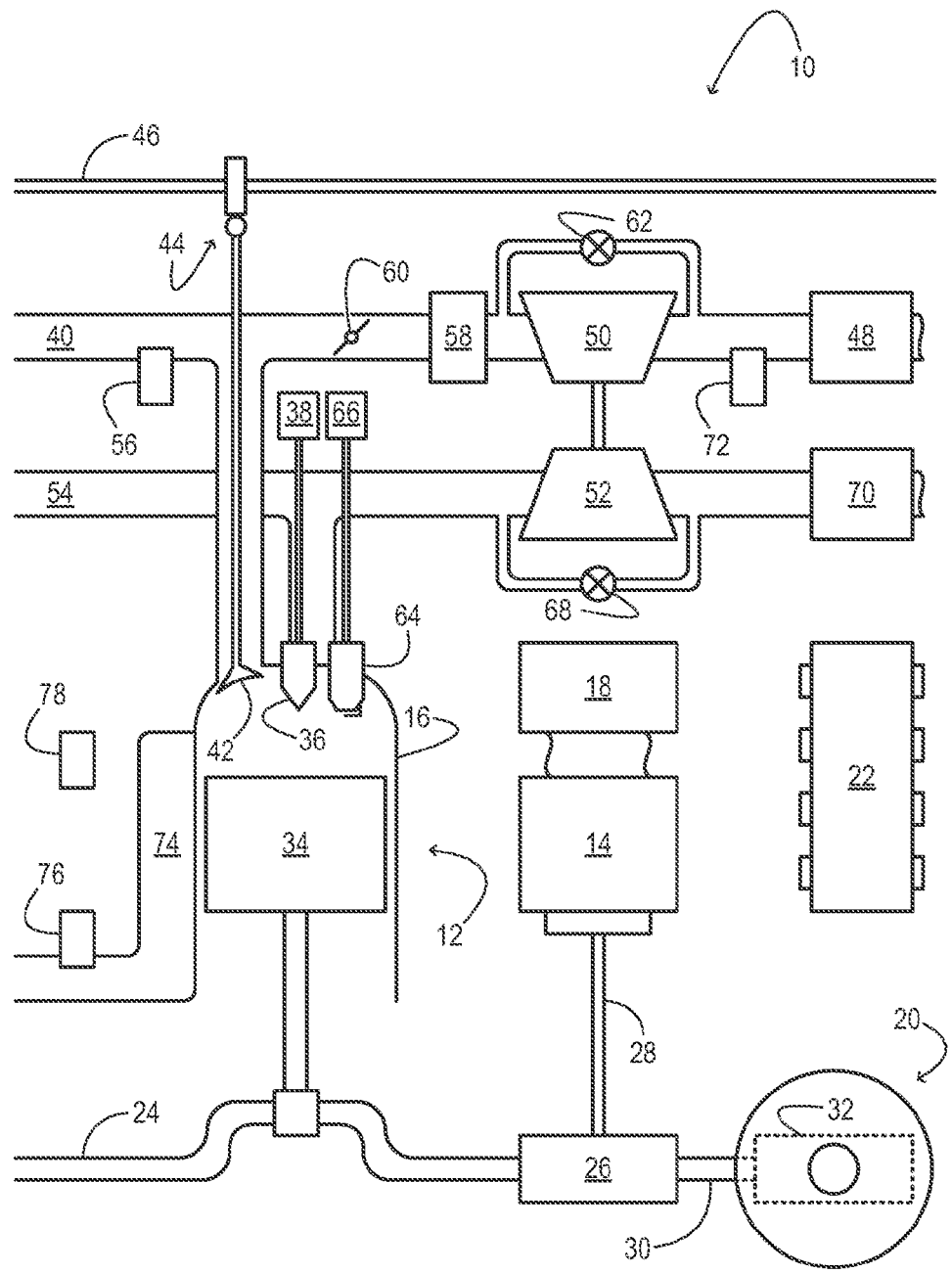
FIG. 1 shows aspects of an example vehicle in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example vehicle 10 in one embodiment. The vehicle includes both an internal combustion engine 12 and an electric motor 14. The engine produces mechanical energy by combusting fuel and air in cylinder 16. The electric motor produces mechanical energy by transducing electrochemical energy stored in battery 18. Both the engine and the electric motor are configured to provide torque to the wheels 20 of the vehicle. Accordingly, vehicle 10 may be a 'hybrid' vehicle. It will be understood, however, that this disclosure is in no way limited to hybrid vehicles, as electric motor 14 may be omitted in some embodiments.

Vehicle 10 includes electronic control system 22. The electronic control system is configured to receive input from various sensors arranged in the vehicle. The electronic control system is also configured to actuate various electronically controllable valves and other componentry of the vehicle. Accordingly, the electronic control system includes memory and processors configured for appropriate decision making responsive to the sensor input and directed to intelligent control of the componentry. Such decision-making may be enacted according to various strategies such as event-driven, interrupt-driven, multi-tasking, multi-threading, and the like. In this manner, the electronic control system may be configured to enact aspects of the methods disclosed hereinafter—any or all aspects, in some embodiments. As such, the disclosed process steps (operations, functions, and/or acts) may represent code to be programmed into machine-readable storage medium in the electronic control system.

Continuing in FIG. 1, engine 12 includes crankshaft 24, which is coupled into automatic transmission 26. Motor shaft 28 of electric motor 14 is also coupled into the automatic transmission. The automatic transmission may include appropriate gearing to constructively combine the rotational energy of the motor shaft with that of the crankshaft and to deliver such energy to driveshaft 30. The automatic transmission may include appropriate gearing to apply the rotational energy to the driveshaft at a plurality of different torque and speed values. For instance, the automatic transmission may include a first gear, via which the rotational energy is delivered to the driveshaft at relatively low speed and relatively high torque, a second gear in which the rotational energy is delivered at higher speed and lower torque, a third gear in which the rotational energy is delivered at still higher speed and still lower torque, and so on. Coupled to the driveshaft, differential 32 distributes the rotational energy from the driveshaft to the wheels. As further described below, the automatic transmission may admit of a plurality of up-shift and down-shift vehicle-speed thresholds. For example, the automatic transmission may automatically up-shift from first gear to second gear when the vehicle speed exceeds a certain threshold; it may down-shift from second gear to first gear when the vehicle speed falls below another threshold. In other embodiments, the threshold speeds that determine shifting may be based on engine speed instead of vehicle speed. In yet other embodiments, a combination of vehicle speed and engine speed may be used. In still other embodiments, the automatic transmission may be replaced by a manual transmission actuated by a driver of the vehicle.

Mechanically coupled to crankshaft 24, piston 34 reciprocates within cylinder 16. The cylinder may be one of a plurality of cylinders of engine 12. The illustrated engine is a direct-injection engine; the cylinder receives fuel from fuel injector 36, which is sourced by electronic fuel injection system 38. The electronic fuel injection system may include suitable fuel lines, a lift pump, and a high-pressure pump (not shown in the drawings). The electronic fuel injection system may be controlled by electronic control system 22.

Cylinder 16 receives air from intake manifold 40. The air is controllably admitted to the cylinder through intake valve 42, which is actuated by variable cam timing (VCT) actuator 44, coupled to camshaft 46. The camshaft is rotationally coupled to crankshaft 24. In one embodiment, the VCT actuator may be rotationally coupled to the crankshaft, but also responsive to commands of electronic control system 22. For example, the electronic control system may command an advance or delay in an opening or closing timing of the intake valve relative to top dead center of the intake stroke of the cylinder, to effect the desired intake valve opening and closing schedule. In other embodiments, the camshaft and/or VCT actuator may be omitted and replaced by electronically actuated intake and exhaust valves whose opening and closure are commanded by the electronic control system.

In vehicle 10, fresh air is inducted into air cleaner 48 and flows to compressor 50. The compressor may be any suitable intake-air compressor—a motor-driven or driveshaft driven supercharger compressor, for example. In the illustrated embodiment, the compressor is a turbocharger compressor mechanically coupled to turbine 52, the turbine driven by expanding engine exhaust from exhaust manifold 54. In one embodiment, the compressor and turbine may be coupled within a twin scroll turbocharger. In another embodiment, the turbocharger may be a variable geometry turbocharger (VGT), in which turbine geometry is actively varied as a function of engine speed. Manifold air pressure (MAP) sensor 56 is coupled in the intake manifold and configured to provide to the electronic control system an input responsive to the air pressure in the intake manifold.

Compressor 50 is coupled fluidically to intake manifold 40 via charge-air cooler 58 and throttle valve 60. The charge-air cooler may be any suitable heat exchanger configured to cool the intake air charge for desired combustion and emissions-control performance. As shown in FIG. 1, compressor by-pass valve 62 is coupled between the inlet and the outlet of the compressor. The compressor by-pass valve may be a normally closed valve configured to open at the command of an electronic control system in order to relieve excess boost pressure under selected operating conditions.

Ignition of the intake air charge in cylinder 16 is effected via spark plug 64, which receives timed voltage pulses from electronic ignition system 66. The electronic ignition system may be operatively coupled to electronic control system 22, which may command any suitable amount of spark advance for the cylinder. During the exhaust stroke, exhaust gas is expelled from the cylinder to exhaust manifold 54. The exhaust may be released though an exhaust valve coupled to the cylinder (not shown in the drawings), also actuated by a VCT actuator.

In the illustrated embodiment, exhaust from exhaust manifold 54 flows to turbine 52 to drive the turbine. When reduced turbine torque is desired, some exhaust may be directed instead through waste gate 68, by-passing the turbine. The combined flow from the turbine and the waste gate then flows through exhaust-aftertreatment stage 70. In the illustrated embodiment, the exhaust flows over soot sensor 72 en route to the exhaust-aftertreatment stage. The soot sensor is configured to provide to electronic control system 22 an input responsive to the amount of soot emitted by the engine, which may be used to diagnose combustion efficiency, fuel atomization, etc. In other embodiments, the soot sensor, in addition to other emissions-control sensors, may be arranged downstream of one or more exhaust aftertreatment devices in the exhaust flow.

The nature, number, and arrangement of devices in exhaust-aftertreatment stage 70 may differ in the different embodiments of this disclosure. In general, the exhaust-aftertreatment stage may include at least one exhaust-aftertreatment catalyst configured to catalytically treat the exhaust flow, and thereby reduce an amount of one or more substances in the exhaust flow. For example, one exhaust-aftertreatment catalyst may be configured to trap $NO_x$ from the exhaust flow when the exhaust flow is lean, and to reduce the trapped $NO_x$ when the exhaust flow is rich. In other examples, an exhaust-aftertreatment catalyst may be configured to disproportionate $NO_x$ or to selectively reduce $NO_x$ with the aid of a reducing agent. In still other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment stage, either separately or together. In some embodiments, the exhaust-aftertreatment stage may include a regenerable soot filter configured to trap and oxidize soot particles in the exhaust flow. All or part of the treated exhaust from the exhaust aftertreatment devices may be released into the ambient via a silencer (not shown in the drawings).

In engine 12, excess heat from combustion in cylinder 16 is discharged to coolant 74. The temperature of the coolant is measured by coolant temperature sensor 76 and communicated to electronic control system 22. Vehicle 10 also includes an ambient air-temperature sensor 78, also coupled operatively to the electronic control system.

The configurations described above enable various methods for operating an engine of a vehicle. Accordingly, some such methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated in this disclosure.

Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 2:
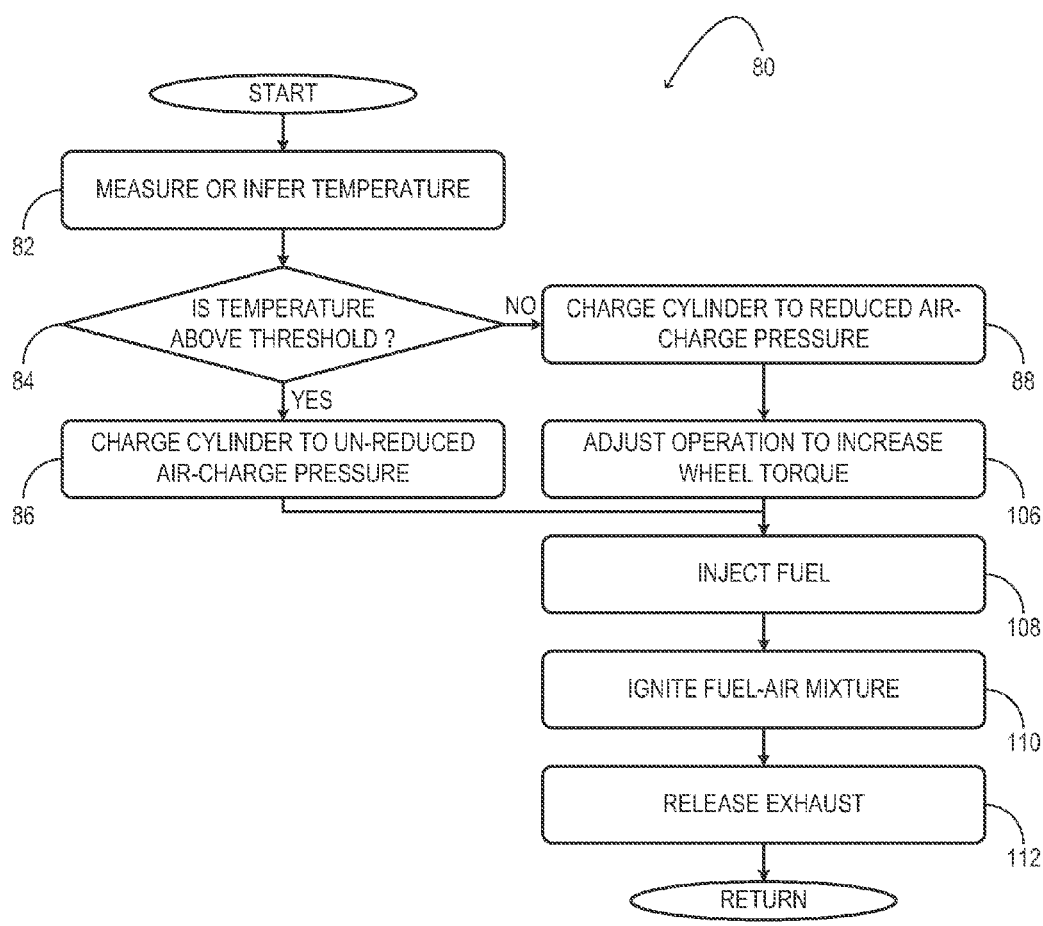
FIG. 2 illustrates an example method for operating an engine of a vehicle in accordance with an embodiment of this disclosure.

FIG. 2 illustrates an example method 80 for operating an engine of a vehicle in response to driver demand. In one embodiment, the method may be enacted during a cold start of the engine and ended after a warm-up period following the cold start.

At 82 of method 80, a temperature is measured or inferred. In one embodiment, the temperature may be a coolant temperature of the engine measured via engine-coolant temperature sensor 76. In another embodiment, the temperature may be a measured head temperature of a cylinder of the engine. In other embodiments, the temperature may be an inferred fuel temperature or an inferred piston-crown temperature in the cylinder. In some embodiments, the temperature may be inferred based partly on a measured temperature—measured via coolant temperature sensor 76 and/or ambient air-temperature sensor 78, for example.

At 84 it is determined whether the measured or inferred temperature is above a threshold. This determination indicates to the electronic control system whether the engine is operating during or after a warm-up period following a cold start of the vehicle. The warm-up period is intended to last until the fuel, if injected into the cylinder at the non-reduced air-charge pressure, would be vaporized at target efficiency. Accordingly, the time at which the warm-up period ends may be determined by comparing the measured or inferred temperature to a predetermined threshold temperature. In other words, the warm-up period may persist until the measured or inferred temperature exceeds a predetermined threshold temperature. In one particular embodiment, the predetermined threshold temperature may be determined based on an output of a soot sensor—e.g., soot sensor 72—coupled in an exhaust conduit of the vehicle. For example, electronic control system 22 may be configured to adjust the predetermined threshold temperature to the lowest value consistent with capping soot emissions at a desired level. When too much soot is emitted after (e.g., just after) the warm-up period is discontinued, the electronic control system may raise the predetermined threshold temperature to lengthen the duration of the next warm-up period. When very little soot is emitted after the warm-up period is discontinued, the electronic control system may lower the predetermined threshold temperature to shorten the duration of the next warm-up period.

Continuing in FIG. 2, if the warm-up period is over—i.e., if the temperature is above the threshold—then the method advances to 86, where the cylinders of the engine are charged to a non-reduced air-charge pressure. However, if the warm-up period is still in effect—i.e., if temperature is not above the threshold—then the method advances to 88, where the cylinders are charged to a reduced air-charge pressure. The reduced air-charge pressure is lower, for an equivalent driver demand, than the non-reduced air-charge pressure. In some non-limiting examples, the reduced air-charge pressure may be 20% lower, 50% lower, etc.

In the present context, cylinder charging includes the actions of admitting a controlled amount of air into a cylinder during the intake stroke of the cylinder, and, compressing the air charge during the subsequent compression stroke. The admitted air mass determines the air-charge pressure in the cylinder when fuel is directly injected into the cylinder and mixes with the admitted air.

In some embodiments, charging a cylinder to the reduced air-charge pressure includes reducing an intake-valve lift applied during the warm-up period relative to the intake-valve lift applied after the warm-up period, for an equivalent driver demand. Alternatively or in addition, the intake-valve opening duration applied during the warm-up period may be shortened relative to the intake-valve opening duration applied after the warm-up period, for the equivalent driver demand. Shortening the intake-valve opening duration may include retarding an opening timing and/or advancing a closing timing of the intake valve during the warm-up period.

More particularly, the intake valve may be actuated according to a pressure-maintaining schedule above the predetermined threshold temperature, and according to a pressure-reducing schedule below the predetermined threshold temperature. As further described below, the pressure-reducing schedule may effect a lower air-charge pressure in the cylinder at the time of direct injection of the fuel than does the pressure-maintaining schedule.

Figure 3:
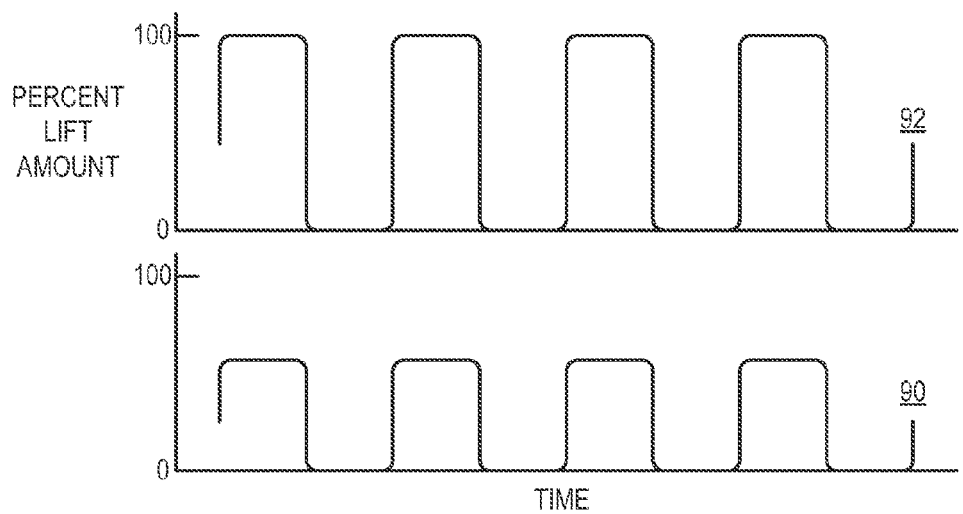
FIGS. 3 through 5 are graphs that show example first and second intake valve schedules consistent with various embodiments of this disclosure.
Figure 4:
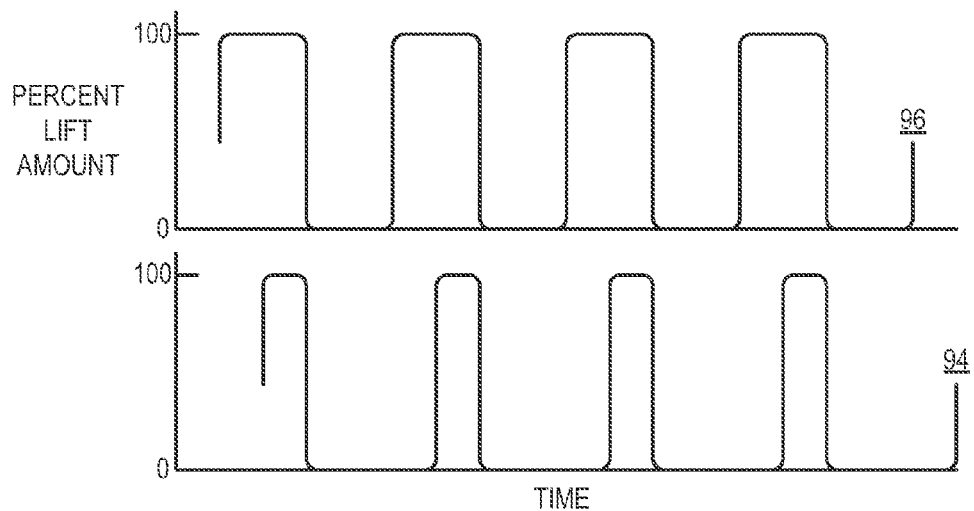
Figure 5:
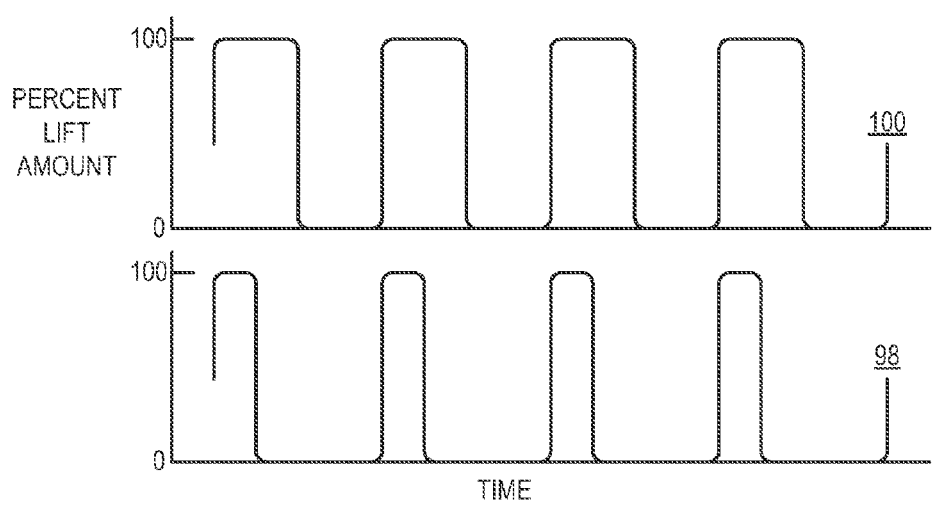

The graphs of FIGS. 3 through 5 show example intake-valve schedules consistent with the embodiments described above. In FIG. 3, pressure-reducing schedule 90 commands a lower lift of the intake valve than does pressure-maintaining schedule 92. In the embodiments of FIGS. 4 and 5, the pressure-reducing schedules command a shorter opening period of the intake valve than do the pressure-maintaining schedules. In FIG. 4, specifically, pressure-reducing schedule 94 commands a later opening timing of the intake valve than does pressure-maintaining schedule 96. In FIG. 5, pressure-reducing schedule 98 commands an earlier closing timing of the intake valve than does pressure-maintaining schedule 100. In each of the illustrated approaches, the pressure-reducing schedule results in a lower air-charge pressure in the cylinder than does the pressure-maintaining schedule. Enacted during low-temperature conditions, the lower pressure enhances fuel atomization and vaporization to prevent excessive PM emissions.

In some of the embodiments considered herein, it is not always necessary to suppress the MAP to achieve reduced air-charge pressures. This is because VCT allows the cylinders to be charged to the desired pressure (86 and 88 in FIG. 2) irrespective of the MAP. The opening period and lift amount of the intake valve, together with the MAT and MAP, determine the mass of the air charge admitted, which, in turn, determines the air-charge pressure at the time during the compression stroke when fuel is injected into the cylinder (108 in FIG. 2).

Accordingly, by controlling the amount of air admitted during the intake stroke, the air-charge pressure at the time of direct injection of fuel into the cylinder can be controlled. For instance, when the predetermined threshold temperature is exceeded, air may be compressed to the air-charge pressure normally desired to optimize engine performance or fuel economy. When the predetermined threshold temperature is not exceeded, air may be compressed to a lower pressure. The lower air-charge pressure may result from the intake valve being open for a shorter period of time, by a lower lift amount, etc., not necessarily because the air is admitted from an intake manifold of lower MAP. The lower air-charge pressure enables more efficient atomization and vaporization of the directly injected fuel, which is especially important at low cylinder temperatures that would otherwise delay vaporization of the fuel. Significant for turbocharged engine systems, this beneficial effect is provided after a cold start, while still allowing boost pressure in the intake manifold to accumulate. In this manner, PM emissions may be reduced with minimal loss of acceleration potential.

In some embodiments, charging to the reduced air-charge pressure (88 of method 80) includes operating the engine at higher speed for an equivalent driver demand (e.g., for the same wheel power) than charging to the non-reduced air-charge pressure (at 86). Further, charging to the reduced air-charge pressure may include operating the engine at lower torque and high speed for the equivalent driver demand than charging to the non-reduced air-charge pressure. In particular, operating the engine at the higher speed and lower torque for the equivalent driver demand may include increasing an engine- or vehicle-speed threshold at which an automatic transmission of the vehicle shifts to a higher gear. In other words, the speed threshold at which the automatic transmission shifts to a higher gear may be increased during the warm-up period. After the warm-up period, the speed threshold may be restored to the normal value. As noted earlier, the warm-up period may last until fuel, if injected into a cylinder of the engine charged to the non-reduced air-charge pressure, would be vaporized at target efficiency. More particularly, the warm-up period may last until the temperature measured or inferred at 82 of method 80 exceeds a predetermined threshold temperature. In this manner, during the warm-up period following a cold start of the vehicle and in response to insufficient atomization of directly injected fuel, a transmission up-shift may be delayed until detection of a higher driver-demand level than would otherwise cause the up-shift.

Figure 6:
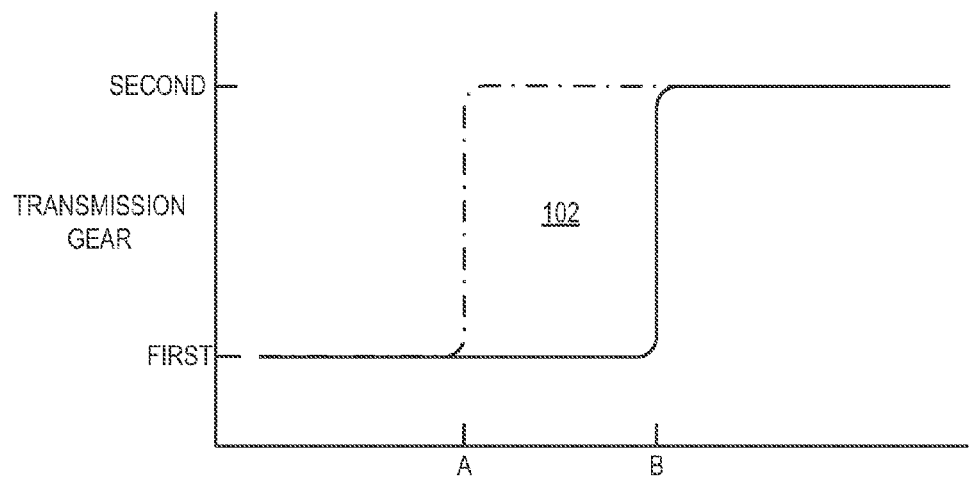
FIGS. 6 and 7 illustrate example gear-shifting programs that can be enacted by an automatic transmission of a vehicle in accordance with embodiments of this disclosure.
Figure 6:
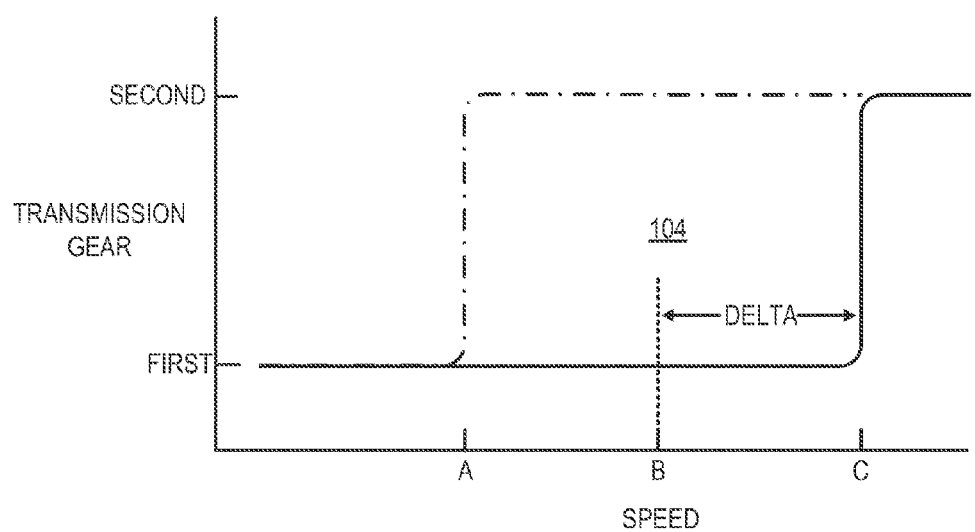

FIG. 6 illustrates two example gear-shifting programs that can be enacted by automatic transmission 26 of the vehicle. In these graphs, the lines represent gear ratio as a function of vehicle speed. The solid line shows the gear ratio for conditions of increasing speed, while the dot-dashed line shows the gear ratio for conditions of decreasing speed. The graphs show a first program 102 that may be enacted above the predetermined threshold temperature, and a second program 104 that may be enacted below the predetermined threshold temperature. In both programs the transmission down-shifts from the second gear to the first gear at the same speed threshold. However, the transmission up-shifts from the first gear to the second gear at a higher speed threshold in the first program than in the second program. The difference between the threshold speeds in the two programs is labeled 'delta'. Such operation causes the engine to operate at higher speed and lower torque during the warm-up period, when incomplete atomization and vaporization of fuel could otherwise lead to excessive PM emissions. In the first program, relative to the second, the engine is rotating faster at the point when the transmission finally does shift from first to second gear. Accordingly, the benefit of the reduced air-charge for PM control extends into second gear, in this embodiment.

From another viewpoint, delaying the transmission up-shift causes the amount of operation at low speed/high load to be reduced for a given acceleration profile, in that rather than shifting earlier and then having an increased amount of operation at lower speed and lower loads (and thus higher MAP), at least some of this operation is avoided and replaced by continued operation in the lower gear with higher speed and lower load (and thus lower MAP). Considering FIG. 6 again, over operating window of the "delta", when shifting earlier the engine may have improved fuel economy, but over the operational duration as the speed traverses the "delta" region, the MAP will be higher than if the shift occurred later. In the later up-shift scenario, the engine will have a lower MAP as the speed traverses the "delta." Thus, while operation outside the "delta" between the different scenarios may be relatively equivalent, the operation, and thus the MAP, through the "delta" may be altered via the approach described herein (e.g., the second program) in that emissions can be reduced over this region, which may be the region most impacted by increased particulate emissions from direct injection with low MAP.

Figure 7:
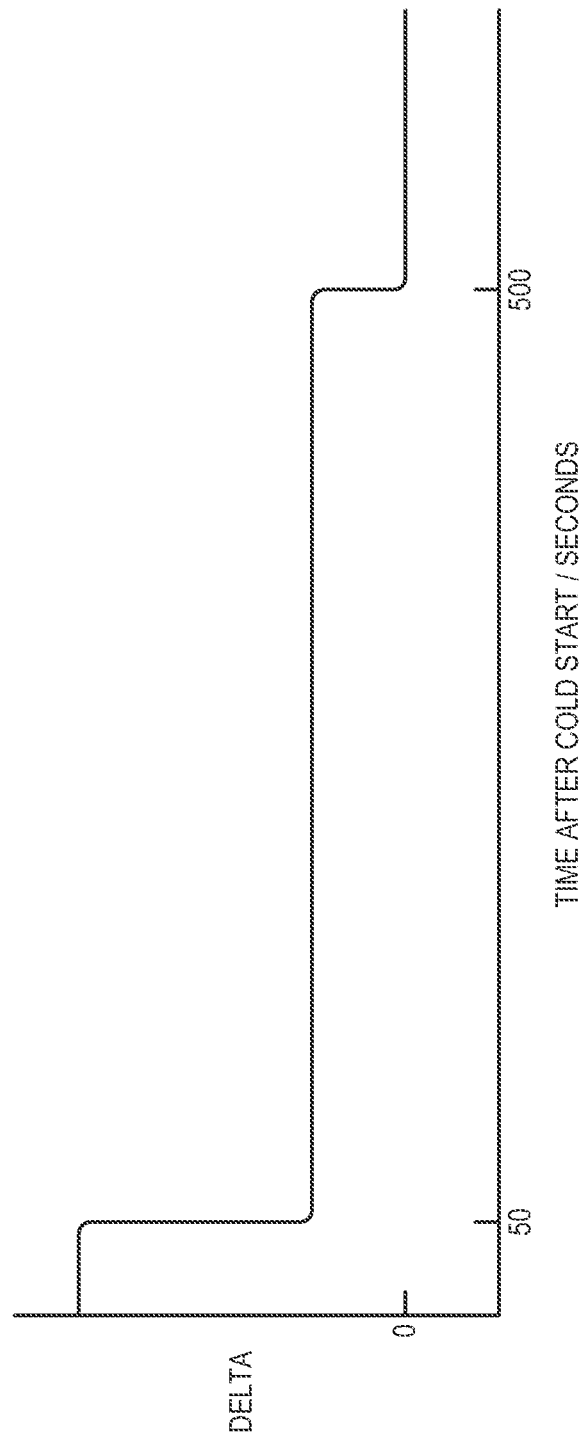

In some embodiments, the temperature-dependent thresholds described above may be integrated into a more complex program in which the shifting thresholds of the automatic transmission respond to temperature. For example, an up-shift threshold may be increased at low temperatures merely to increase the rate of heating of the transmission oil for suitable viscosity. Such heating will typically take place over a much longer timescale than the heating of the engine cylinders for effective fuel vaporization. Further, the appropriate deltas in the up-shift thresholds will generally differ over the two different timescales. This scenario is illustrated by example in FIG. 7, where a relatively large increase in up-shift speed threshold prevails for a short period of time after cold start to reduce PM emissions, and a smaller increase persists for a longer period to reduce transmission-oil viscosity. In still other embodiments, operating the engine at the higher speed and lower torque may include powering an electric motor coupled in a drive train of the vehicle.

Returning now to FIG. 2, at 106 motor-vehicle operation may be adjusted to increase wheel torque during the warm-up period. In one embodiment, this action may include powering an electric motor coupled in a drive train of the vehicle. In another embodiment, a spark advance in the cylinder may be retarded to increase a temperature of exhaust conducted to a turbine of the vehicle, and thereby increase wheel torque. At 108 of method 80, fuel is directly injected into the cylinder, and at 110, the fuel-air mixture is ignited via a spark discharge in the cylinder. This action drives a subsequent expansion stroke and is followed at 112 by an exhaust stroke, which releases exhaust from the cylinder.

In one embodiment, during a warm-up period following a cold start of the vehicle and in response to insufficient atomization of directly injected fuel causing increased particulate emissions, the engine and transmission controller delays a transmission up-shift. The up-shift may be delayed by triggering the up-shift only after a lower driver-demanded level of engine output is requested, or only after the vehicle speed and/or engine speed reaches a higher level than would otherwise trigger the up-shift. In this way (when atomization may be an issue), the engine operates (for at least the duration of the delay) at higher speeds and lower manifold pressures than it otherwise would, had the shift not been delayed. In other words, during the delay period, rather than the shift occurring at the beginning of that period (as it normally would—to improve fuel economy by operating the engine at lower speeds and higher manifold pressure), the shift is delayed. Thus, from the point of where the shift would normally occur, up to the point of the delayed shift, the engine is operated at higher speeds and lower manifold pressure (and thus with less adverse effects from insufficient vaporization of the injected fuel) since the lower gear is maintained, as the vehicle accelerates. Then, when the shift does occur, the engine speed is reduced and manifold pressure increased, but not as much as they would have been, and further not until a later time. Thus, the method is able to provide a consistent wheel torque for a given driver demand (even when the up-shift is delayed).

It will be understood, finally, that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method for operating an engine of a vehicle in response to a driver demand, the engine having a turbocharger fluidically coupled to an intake manifold, the method comprising:
   during a warm-up period following a cold start of the vehicle, reducing an extent or duration of intake-valve lift and increasing a speed threshold at which an automatic transmission of the vehicle shifts to a higher gear to charge a cylinder of the engine to a reduced air-charge pressure, injecting fuel into the cylinder while operating the turbocharger to accumulate boost pressure in the intake manifold, and increasing wheel torque consistent with the driver demand by providing torque from an electric motor to vehicle wheels via a motor shaft coupling the electric motor with a vehicle transmission; and
   after the warm-up period, restoring the extent or duration of the intake-valve lift to charge the cylinder to a non-reduced air-charge pressure, greater for the same driver demand than the reduced air-charge pressure, and decreasing the speed threshold at which the automatic transmission of the vehicle shifts to a higher gear.

2. The method of claim 1 wherein charging to the reduced air-charge pressure further comprises operating the engine at a lower torque for an equivalent driver demand than charging to the non-reduced air-charge pressure.

3. The method of claim 1 wherein charging the cylinder to the reduced air-charge pressure comprises reducing the intake-valve lift applied during the warm-up period relative to the intake-valve lift applied after the warm-up period, for the same driver demand.

4. The method of claim 1 wherein charging the cylinder to the reduced air-charge pressure comprises shortening an intake-valve opening duration applied during the warm-up period relative to an intake-valve opening duration applied after the warm-up period, for the same driver demand.

5. The method of claim 4 wherein shortening the intake-valve opening duration comprises retarding an opening timing or advancing a closing timing of the intake valve during the warm-up period for the same driver demand.

6. The method of claim 1 wherein the warm-up period lasts until fuel injected into the cylinder at the non-reduced air-charge pressure is vaporized at target efficiency.

7. The method of claim 1 wherein the warm-up period lasts until a measured or inferred temperature exceeds a predetermined threshold temperature.

8. The method of claim 7 wherein the measured or inferred temperature is a measured coolant temperature of the engine.

9. The method of claim 7 wherein the measured or inferred temperature is a measured head temperature of the cylinder of the engine.

10. The method of claim 7 wherein the measured or inferred temperature is an inferred fuel temperature or piston-crown temperature of the cylinder of the engine.

11. The method of claim 10 further comprising inferring the fuel temperature or the piston-crown temperature based partly on ambient temperature.

12. The method of claim 7 wherein the predetermined threshold temperature is determined based on an output of a soot sensor coupled in an exhaust conduit of the vehicle.

13. A method for operating an engine of a vehicle in response to a driver demand, the engine having a turbocharger fluidically coupled to an intake manifold, the method comprising:
   in response to insufficient atomization of directly injected fuel causing increased particulate emissions during a warm-up period following a cold start of the vehicle, reducing an extent or duration of intake-valve lift and increasing a speed threshold at which an automatic transmission of the vehicle shifts to a higher gear to charge a cylinder to a reduced air-charge pressure, while operating the turbocharger to accumulate boost pressure in the intake manifold, and increasing wheel torque consistent with the driver demand by providing torque from an electric motor to vehicle wheels via a motor shaft coupling the electric motor with a vehicle transmission; and
   after the warm-up period, restoring the extent or duration of the intake-valve lift to charge the cylinder to a non-reduced air-charge pressure, greater for the same driver demand than the reduced air-charge pressure, the warm-up period lasting until fuel injected at the non-reduced air-charge pressure is vaporized in the engine at target efficiency, and decreasing the speed threshold at which the automatic transmission of the vehicle shifts to a higher gear.

14. A method for operating an engine of a vehicle in response to a driver demand, the engine having a turbocharger fluidically coupled to an intake manifold, the method comprising:
   in response to insufficient atomization of directly injected fuel causing increased particulate emissions during a warm-up period following a cold start of the vehicle, delaying an up-shift of a vehicle transmission to occur responsive to a lower driver-demand level or higher engine speed than would otherwise cause the up-shift, and increasing wheel torque consistent with the driver demand by providing torque from an electric motor to vehicle wheels via a motor shaft coupling the electric motor with the vehicle transmission; and
   after the warm-up period, operating the turbocharger to accumulate boost pressure in the intake manifold.

15. The method of claim 14 further comprising admitting directly injected fuel into a cylinder at a first air-charge pressure during the warm-up period and at a second, higher air-charge pressure after the warm-up period.

16. The method of claim 14 wherein the transmission up-shift occurs at one or more of an engine-speed threshold and a vehicle-speed threshold.

17. The method of claim 14 wherein the fuel is injected into a cylinder charged to a reduced air-charge pressure in a second or higher gear of the transmission.

* * * * *